(12) United States Patent
Orita

(10) Patent No.: US 8,762,913 B2
(45) Date of Patent: Jun. 24, 2014

(54) RECORDING MEDIUM FOR GENERATION PROGRAM FOR CONNECTION OF PRINTED CIRCUIT BOARDS, GENERATION METHOD FOR CONNECTION OF PRINTED CIRCUIT BOARDS, AND GENERATION APPARATUS FOR CONNECTION OF PRINTED CIRCUIT BOARDS

(71) Applicant: Fujitsu Limited, Kawasaki (JP)

(72) Inventor: Takahiko Orita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/780,636

(22) Filed: Feb. 28, 2013

(65) Prior Publication Data

US 2013/0326444 A1 Dec. 5, 2013

(30) Foreign Application Priority Data

May 30, 2012 (JP) ................................ 2012-123702

(51) Int. Cl.
*G06F 17/50* (2006.01)

(52) U.S. Cl.
USPC ............ 716/111; 716/126; 716/129; 716/137

(58) Field of Classification Search
USPC .................................. 716/111, 126, 129, 137
See application file for complete search history.

(56) References Cited

U.S. PATENT DOCUMENTS

| | | | |
|---|---|---|---|
| 6,568,944 B1 * | 5/2003 | Meyer et al. | 439/79 |
| 6,755,666 B2 * | 6/2004 | Meyer et al. | 439/79 |
| 2002/0069395 A1 | 6/2002 | Fujiwara et al. | |
| 2002/0115334 A1 * | 8/2002 | Meyer et al. | 439/377 |

FOREIGN PATENT DOCUMENTS

| | | |
|---|---|---|
| JP | 11-66118 | 3/1999 |
| JP | 2001-325315 | 11/2001 |
| JP | 2002-288256 | 10/2002 |

* cited by examiner

*Primary Examiner* — Vuthe Siek
(74) *Attorney, Agent, or Firm* — Staas & Halsey LLP

(57) ABSTRACT

In a generation method, the computer detects a contact between a pin data group of a first connection destination included in three-dimensional shape data and a pin data group of a first connection source included in three-dimensional shape data of a connector, and determines first contact information that indicates combinations of pin data items of the pin data group of the first connection destination and respective pin data items of the pin data group of the first connection source. Furthermore, the computer detects a contact between a pin data group of a second connection destination and a pin data group of a second connection source, and determines second contact information that indicates combinations of pin data items of the pin data group of the second connection destination and respective pin data items of the pin data group of the second connection source, and generates a connection relationship data group.

10 Claims, 12 Drawing Sheets

FIG. 3

| ID | FIRST PIN | SECOND PIN | DELAY VALUE [ps] |
|---|---|---|---|
| r1 | A01 | B01 | 1 |
| r2 | A02 | B02 | 1 |
| ⋮ | ⋮ | ⋮ | ⋮ |
| r40 | A40 | B40 | 1 |

FIG. 5

| CONTACT ID | FIRST PIN | FIRST CONNECTION DESTINATION PIN |
|---|---|---|
| ta1 | A01 | PC1 |
| ta2 | A02 | PC2 |
| ⋮ | ⋮ | ⋮ |
| ta40 | A40 | PC40 |

FIG. 6

| CONTACT ID | SECOND PIN | SECOND CONNECTION DESTINATION PIN |
|---|---|---|
| tb1 | B01 | CN1-01 |
| tb2 | B02 | CN1-02 |
| ⋮ | ⋮ | ⋮ |
| tb40 | B40 | CN2-20 |

FIG. 7

| FIRST CONNECTION DESTINATION | M1 | | |
|---|---|---|---|
| SECOND CONNECTION DESTINATION | M2 | | |
| CONNECTION ID | FIRST CONNECTION DESTINATION PIN | SECOND CONNECTION DESTINATION PIN | DELAY VALUE [ps] |
| R1 | PC1 | CN1-01 | 1 |
| R2 | PC2 | CN1-02 | 1 |
| ⋮ | ⋮ | ⋮ | ⋮ |
| R40 | PC40 | CN2-20 | 1 |

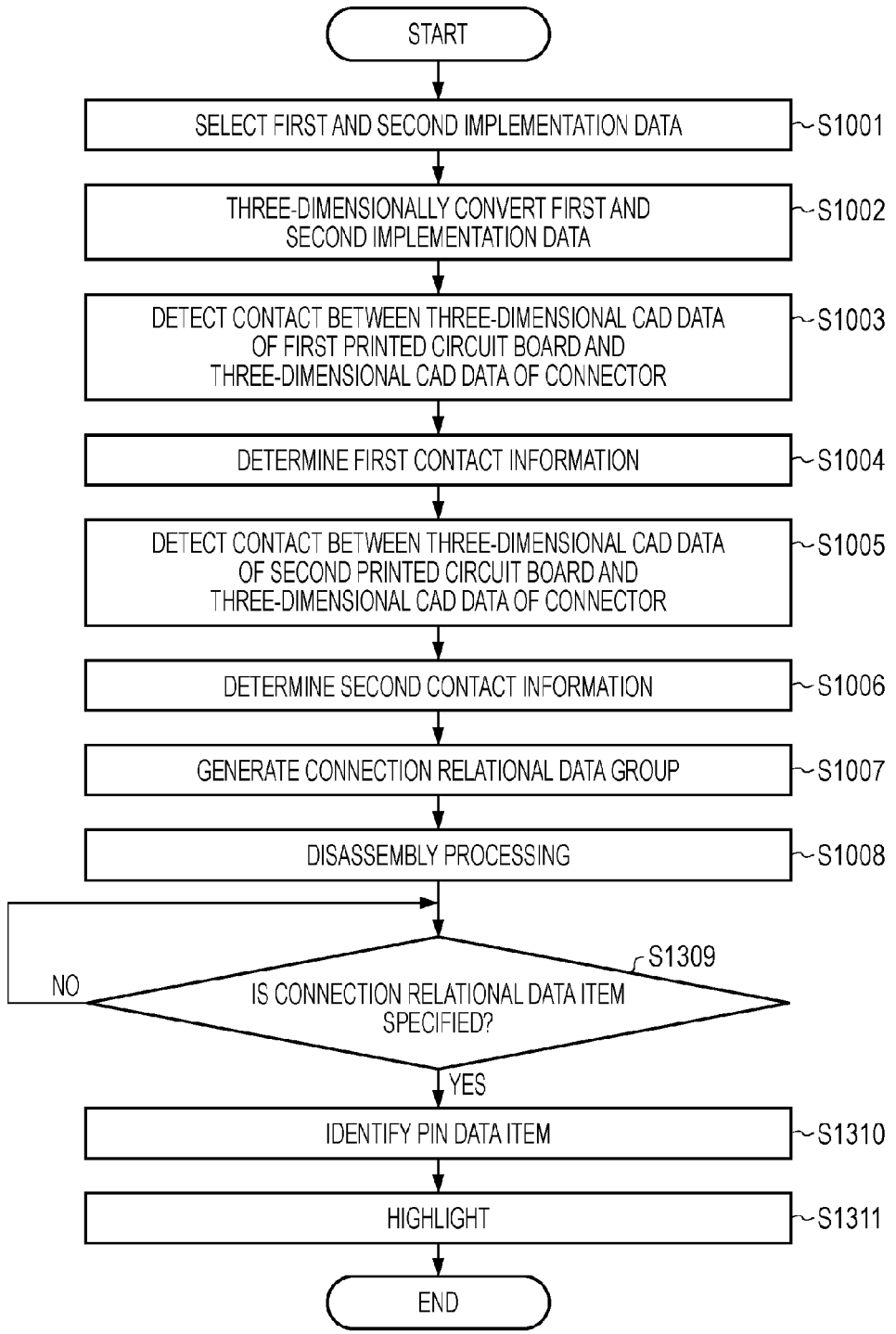

RECORDING MEDIUM FOR GENERATION PROGRAM FOR CONNECTION OF PRINTED CIRCUIT BOARDS, GENERATION METHOD FOR CONNECTION OF PRINTED CIRCUIT BOARDS, AND GENERATION APPARATUS FOR CONNECTION OF PRINTED CIRCUIT BOARDS

CROSS-REFERENCE TO RELATED APPLICATION

This application is based upon and claims the benefit of priority of the prior Japanese Patent Application No. 2012-123702, filed on May 30, 2012, the entire contents of which are incorporated herein by reference.

FIELD

The embodiments discussed herein are related to a recording medium for a generation program, a generation method, and a generation apparatus.

BACKGROUND

In the related art, there is a technique for designing connections between a plurality of printed circuit boards in electronic apparatuses such as transmission apparatuses and communication apparatuses that include a plurality of printed circuit boards connected to each other via a connector. For example, a technique for checking the validity of a signal connection path through which a signal that is output from an output pin of a driver component to an input pin of a receiver component passes, that is, the validity of connection between signal pins is disclosed in the related art.

In the case where the above-described technique of the related art is employed, connections between a plurality of printed circuit boards are designed by causing an electrical two-dimensional computer aided design (CAD) to read a definition file that defines connection information of physical pins connecting the plurality of printed circuit boards.

However, since two-dimensional CAD data of the plurality of printed circuit boards is used in the above-described technique of the related art, the definition file of the connection information of the physical pins connecting the plurality of printed circuit boards is created by manually specifying the correspondence of the physical pins. For example, a designer manually specifies which pin of the printed circuit boards is to be directly connected to which pin of the connector. When the printed circuit boards are to be connected to each other via the connector, the designer manually specifies which pin of one printed circuit board is to be indirectly connected to which pin of the other printed circuit board. Therefore, there is a problem that design of connection using the above-described technique of the related art causes the design work load of the designer to increase and the design period to be prolonged.

Japanese Laid-open Patent Publication Nos. 2001-325315, 11-66118, and 2002-288256 are examples of the related art.

SUMMARY

According to an aspect of the invention, in a generation method, the computer detects a contact between a pin data group of a first connection destination included in three-dimensional shape data and a pin data group of a first connection source included in three-dimensional shape data of a connector, and determines first contact information that indicates combinations of pin data items of the pin data group of the first connection destination and respective pin data items of the pin data group of the first connection source. Furthermore, the computer detects a contact between a pin data group of a second connection destination and a pin data group of a second connection source, and determines second contact information that indicates combinations of pin data items of the pin data group of the second connection destination and respective pin data items of the pin data group of the second connection source, and generates a connection relationship data group.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is an explanatory diagram illustrating an example of connection definition information that is included in three-dimensional component library data;

FIG. 5 is an explanatory diagram illustrating an example of first contact information;

FIG. 6 is an explanatory diagram illustrating an example of second contact information;

FIG. 7 is an explanatory diagram illustrating an example of connection condition data that includes a connection relationship data group;

FIG. 13 is a method illustrating an example of a procedure of a generation process performed by a generation apparatus according to a second embodiment.

DESCRIPTION OF EMBODIMENTS

A generation program, a generation method, and a generation apparatus according to embodiments will be described in detail below with reference to the accompanying drawings.

Example of Design of Connection

Figure 1:
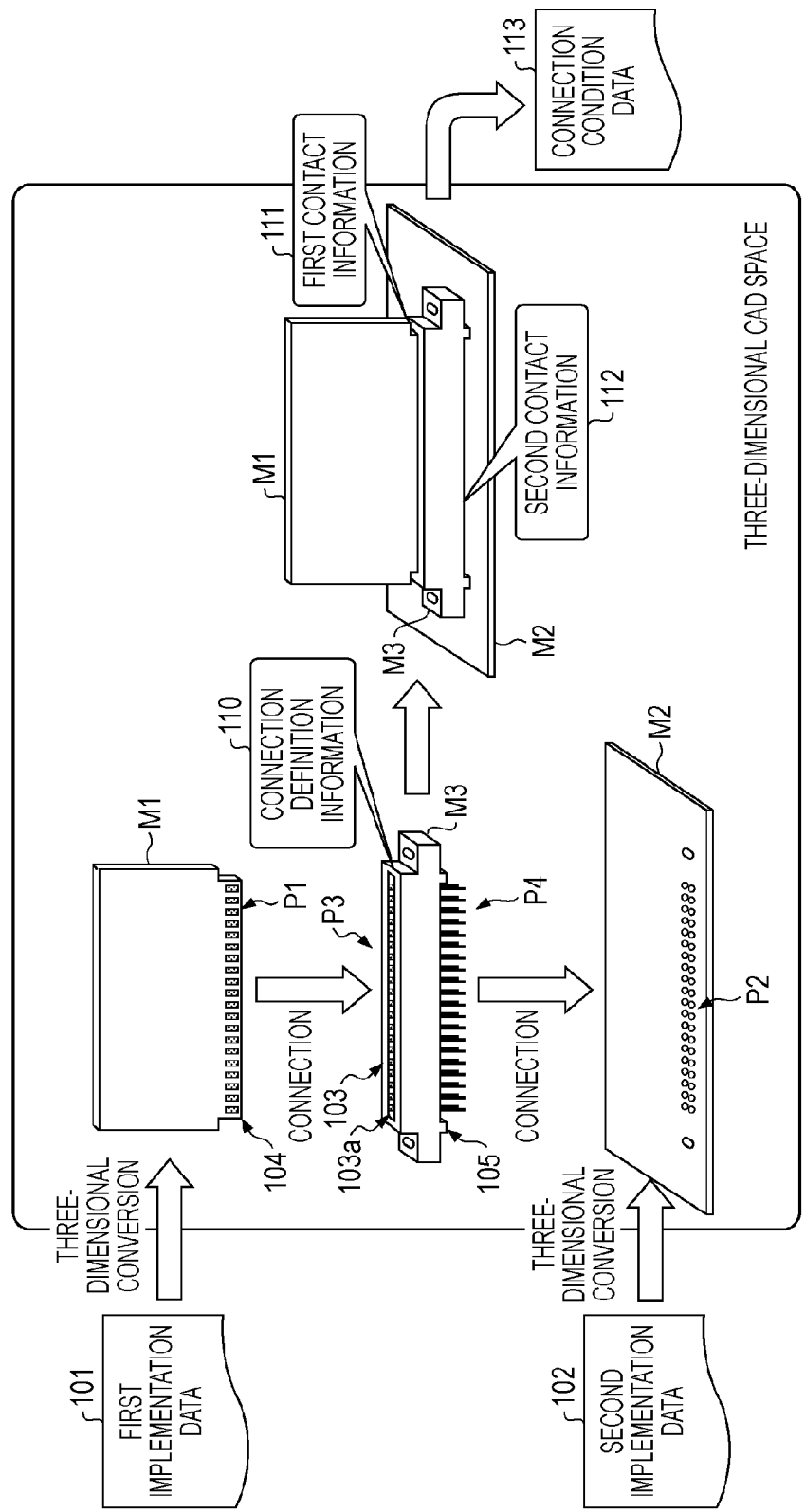
FIG. 1 is an explanatory diagram illustrating an example of design of connection of printed circuit boards that is generated by a generation apparatus.

FIG. 1 is an explanatory diagram illustrating an example of design of connection of printed circuit boards that is generated by the generation apparatus. The generation apparatus converts implementation CAD data (hereinafter simply referred to as "implementation data") of an electrical two-dimensional CAD regarding a printed circuit board into three-dimensional CAD data. For example, the generation apparatus converts first implementation data 101 regarding a first printed circuit board into three-dimensional CAD data M1 regarding the first printed circuit board. Similarly, the generation apparatus converts second implementation data 102 regarding a second printed circuit board into three-dimensional CAD data M2 regarding the second printed circuit board.

The three-dimensional CAD data M1 regarding the first printed circuit board is three-dimensional shape data that determines the three-dimensional shape of the first printed circuit board. The three-dimensional CAD data M1 regarding the first printed circuit board includes pin data that indicates pins. A group of rectangles that are arranged in a lower end edge portion 104 of the three-dimensional CAD data M1 regarding the first printed circuit board is a pin data group P1. Although the pin data is present on the front surface of the lower end edge portion 104 of the three-dimensional CAD data M1 regarding the first printed circuit board in FIG. 1, the pin data is also present on the rear surface of the lower end edge portion 104 of the three-dimensional CAD data M1 regarding the first printed circuit board.

The three-dimensional CAD data M2 regarding the second printed circuit board is three-dimensional shape data that determines the three-dimensional shape of the second printed circuit board. The three-dimensional CAD data M2 regarding the second printed circuit board includes pin data that indicates pins. A group of circles that are arranged in a proximal end portion of the three-dimensional CAD data M2 regarding the second printed circuit board is a pin data group P2.

The generation apparatus reads three-dimensional CAD data M3 regarding a connector from a storage device. The three-dimensional CAD data M3 regarding the connector is three-dimensional shape data that determines the three-dimensional shape of the connector. An opening 103a that is to be connected to the three-dimensional CAD data M1 regarding the first printed circuit board is formed in an upper end portion 103 of the three-dimensional CAD data M3 regarding the connector. The lower end edge portion 104 of the three-dimensional CAD data M1 regarding the first printed circuit board fits into the opening 103a.

A pin data group P3 of a first connection source is present on an inner surface of the opening 103a. A group of rectangles that are arranged on the inner surface of the opening 103a is the pin data group P3 of the first connection source. Pin data of the first connection source is present also on an inner surface that opposes the inner surface on which the pin data group P3 of the first connection source is present. A pin data group P4 of a second connection source is present in a lower end portion 105 of the three-dimensional CAD data M3 regarding the connector. A group of bars projecting downward from the lower end portion 105 is the pin data group P4 of the second connection source.

Pin data items of the pin data group P3 of the first connection source and respective pin data items of the pin data group P4 of the second connection source are connected to each other. Signals from the pin data items of the pin data group P3 of the first connection source are output from the respective pin data items of the pin data group P4 of the second connection source that is a connection destination. Similarly, signals from the pin data items of the pin data group P4 of the second connection source are output from the respective pin data items of the pin data group P3 of the first connection source that is a connection destination. Information that defines which pin data item of the pin data group P3 of the first connection source is connected to which pin data item of the pin data group P4 of the second connection source is connection definition information 110.

The generation apparatus inserts the lower end edge portion 104 of the three-dimensional CAD data M1 regarding the first printed circuit board into the opening 103a of the three-dimensional CAD data M3 regarding the connector in accordance with a user operation using an input device such as a mouse so as to connect the three-dimensional CAD data M1 regarding the first printed circuit board and the three-dimensional CAD data M3 regarding the connector. In this case, pin data items of the pin data group P1 of the three-dimensional CAD data M1 regarding the first printed circuit board and respective pin data items of the pin data group P3 of the first connection source are to come into contact with each other.

Similarly, the generation apparatus inserts the pin data items of the pin data group P4 of the second connection source of the three-dimensional CAD data M3 regarding the connector into respective pin data items of the pin data group P2 of the three-dimensional CAD data M2 regarding the second printed circuit board in accordance with a user operation using an input device such as a mouse so as to connect the three-dimensional CAD data M2 regarding the second printed circuit board and the three-dimensional CAD data M3 regarding the connector. In this case, the pin data items of the pin data group P2 of the three-dimensional CAD data M2 regarding the second printed circuit board and the respective pin data items of the pin data group P4 of the second connection source are to come into contact with each other.

The generation apparatus detects contacts between the pin data items of the pin data group P1 of the three-dimensional CAD data M1 regarding the first printed circuit board and the respective pin data items of the pin data group P3 of the first connection source. Then, the generation apparatus determines which pin data item of the pin data group P1 of the three-dimensional CAD data M1 regarding the first printed circuit board is in contact with which pin data item of the pin data group P3 of the first connection source. Information that is determined in this manner is referred to as first contact information 111.

Similarly, the generation apparatus detects contacts between the pin data items of the pin data group P2 of the three-dimensional CAD data M2 regarding the second printed circuit board and the respective pin data items of the pin data group P4 of the second connection source. Then, the generation apparatus determines which pin data item of the pin data group P2 of the three-dimensional CAD data M2 regarding the second printed circuit board is in contact with which pin data item of the pin data group P4 of the second connection source. Information that is determined in this manner is referred to as second contact information 112.

The generation apparatus collates the connection definition information 110 of the connector, the first contact information 111, and the second contact information 112 so as to generate connection condition data 113. The connection condition data 113 is data that indicates which pin data item of the pin data group P1 of the three-dimensional CAD data M1 regarding the first printed circuit board is indirectly in contact with which pin data item of the pin data group P2 of the three-dimensional CAD data M2 regarding the second printed circuit board. This enables a connection relationship between the three-dimensional CAD data M1 regarding the first printed circuit board and the three-dimensional CAD data M2 regarding the second printed circuit board to be automatically generated and the connection design efficiency to be improved.

Example of Hardware Configuration of Generation Apparatus

Figure 2:
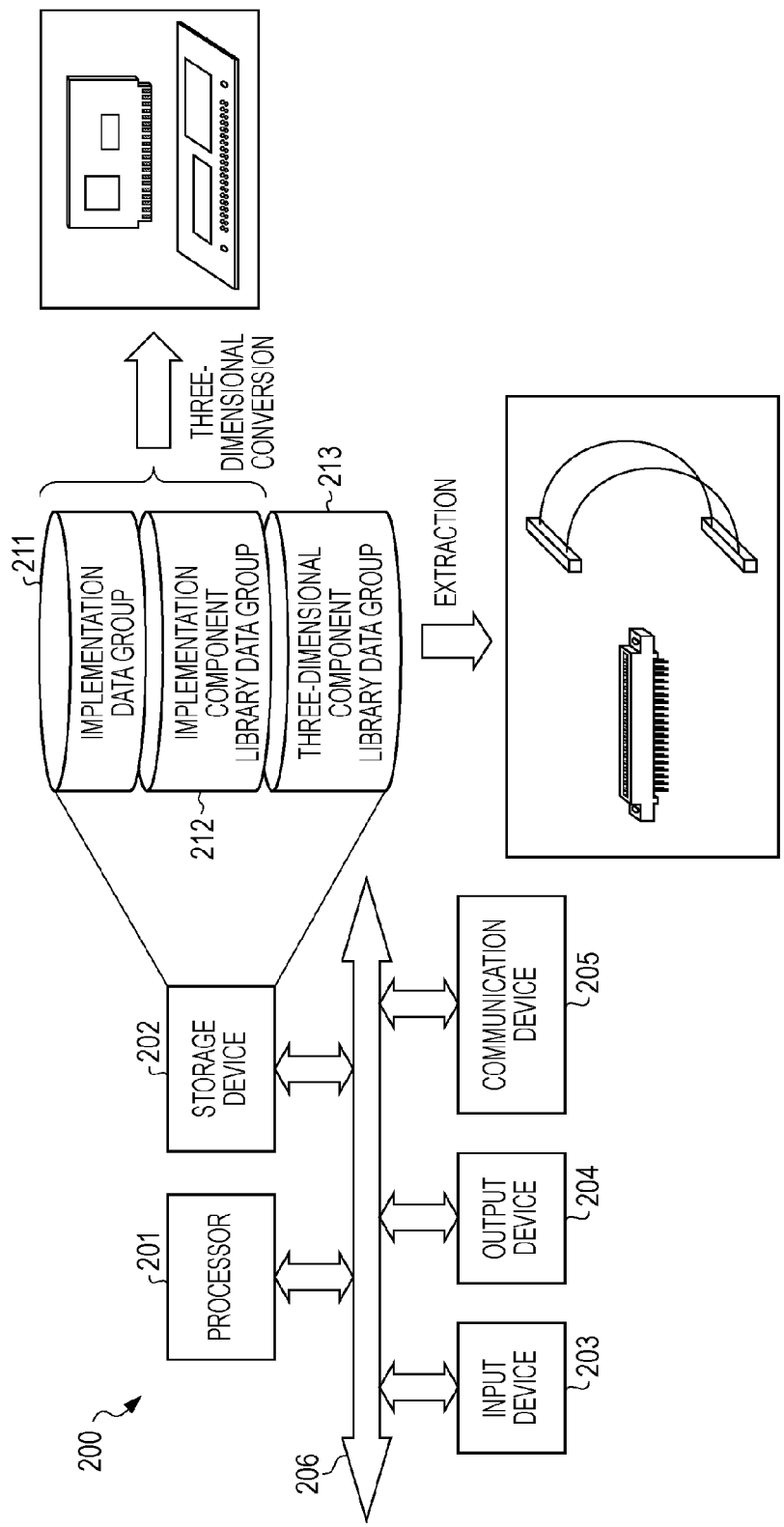
FIG. 2 is a block diagram illustrating an example of a hardware configuration of the generation apparatus.

FIG. 2 is a block diagram illustrating an example of a hardware configuration of a generation apparatus. In FIG. 2, a generation apparatus 200 includes a processor 201, a memory device 202, an input device 203, an output device 204, and a communication device 205 that are connected to a bus 206.

The processor 201 is in charge of overall control of the generation apparatus 200. The processor 201 executes various programs stored in the memory device 202 so as to read data from the memory device 202 and write data that is the execution result into the memory device 202. The various programs include an operating system (OS) and applications such as the generation program of the present embodiment.

The memory device 202 includes a read only memory (ROM), a random access memory (RAM), a flash memory, a magnetic disc drive, and the like. The memory device 202 serves as a work area of the processor 201 and stores the various programs and various data including data that is obtained by executing the various programs.

The input device 203 is an interface, such as a keyboard, a mouse, or a touch panel, that inputs the various data in accordance with a user operation. The output device 204 is an interface that outputs data in accordance with instructions from the processor 201. The output device 204 is, for example, a display or a printer. The communication device 205 is an interface that receives and transmits data from and to the outside of the generation apparatus via a network.

The various data stored in the memory device 202 will now be described. The memory device 202 stores an implementation data group 211, an implementation component library data group 212, and a three-dimensional component library data group 213.

The implementation data group 211 is a cluster of implementation data. The implementation data group 211 includes the above-mentioned first implementation data 101 and second implementation data 102. The implementation data includes, as one example, implementation specification data, board data, implementation component data, implementation component pin data, net data, via data, and line data. The implementation specification data is data that determines the specifications of a printed circuit board. The implementation specification data includes the board name of the printed circuit board and design rules of the printed circuit board such as line width. The board data is data that determines a printed circuit board. The board data includes the number of layers of the printed circuit board, the external shape of the printed circuit board, and the thickness of the printed circuit board. The thickness of the printed circuit board includes the thicknesses of signal layers and the thicknesses of insulating layers between the signal layers.

The implementation component data is data that determines components to be implemented on a printed circuit board. The implementation component data includes the component names of the components to be implemented on the printed circuit board, the surface of the printed circuit board on which the components are to be mounted, and the position coordinates at which the components to be implemented on the printed circuit board are to be disposed.

The implementation component pin data is data that determines component pins to be implemented on a printed circuit board. The implementation component pin data includes the component pin names of the component pins to be implemented on a printed circuit board, the surface of the printed circuit board on which the component pins are to be mounted, the position coordinates at which the component pins are to be disposed, and the layer number of the layer on which the component pins are to be disposed.

The net data is data that determines connection relationships between circuits on a printed circuit board. The net data includes a net number and a net name. The via data is data that determines vias that are present on a printed circuit board. The via data includes the net number of the net on which the vias are present, the coordinates at which the vias are present, and the layer number of the layer on which the vias are present. The line data is data that determines wiring lines on a printed circuit board. The line data includes the net number of the net that includes the wiring lines, the start and end coordinates of the wiring lines, the line widths of the wiring lines, and the layer number of the layer on which the wiring lines are present.

The implementation component library data group 212 is a cluster of implementation component library data. The implementation component library data is data that determines the two-dimensional shapes of components that are to be implemented on a printed circuit board. The implementation component library data includes the component names of components to be implemented, shape data indicating the shapes and heights of the components, the component pin names of component pins to be implemented, signal classification of signals to be input and output to or from the component pins, and the coordinates of the component pins. The signal classification is information that determines the types of the signals such as power, ground, clock, or data bus.

The generation apparatus 200 converts the implementation data into three-dimensional CAD data. In particular, the generation apparatus 200 generates the three-dimensional CAD data by combining the implementation data and the implementation component library data. For example, as illustrated in FIG. 1, the first implementation data 101 is converted into the three-dimensional CAD data M1 regarding the first printed circuit board, and the second implementation data 102 is converted into the three-dimensional CAD data M2 regarding the second printed circuit board. The three-dimensional CAD data includes data included in the implementation data and the implementation component library data. Since the generation of three-dimensional CAD data is publicly known, detailed descriptions thereof will be avoided. Note that three-dimensional CAD data may be stored in the memory device 202 in advance.

The three-dimensional component library data group 213 is a cluster of three-dimensional component library data. An example of the three-dimensional component library data is the three-dimensional CAD data M3 regarding the connector. The connector includes a connection cable. The three-dimensional component library data includes the three-dimensional shape data thereof, three-dimensional shape data of component pins to be implemented, and the connection definition information 110. The generation apparatus 200 extracts the three-dimensional CAD data M3 regarding the connector from the three-dimensional component library data group 213 when the generation apparatus 200 connects three-dimensional CAD data regarding a printed circuit board and three-dimensional CAD data regarding a printed circuit board together.

Connection Definition Information 110

FIG. 3 is an explanatory diagram illustrating an example of the connection definition information 110 included in the three-dimensional component library data. In FIG. 3, the connection definition information 110 includes an ID field, a first pin field, a second pin field, and a delay value field and stores the values of each field as records. Each of the records determines a combination of one of first pins and a corresponding one of second pins that are connected to each other. The ID field stores identification information that determines combinations of the first pins and the respective second pins, the first pins being connected to the respective second pins.

The first pin field stores identification information of the first pins. Each of the first pins is a pin that is to be connected to the first printed circuit board. The second pin field stores identification information of the second pins. Each of the second pins is a pin that is to be connected to the second printed circuit board. The delay value field stores the delay values of signals, and each of the delay values of the signals is the value of a delay of the signal that passes between the corresponding first pin and the corresponding second pin that are connected to each other. In the combination r1 in the ID field of the connection definition information 110, the first pin A01 and the second pin B01 are connected to each other, and the delay value is 1 ps.

First Embodiment

Example of Functional Configuration of Generation Apparatus 200

Figure 4:
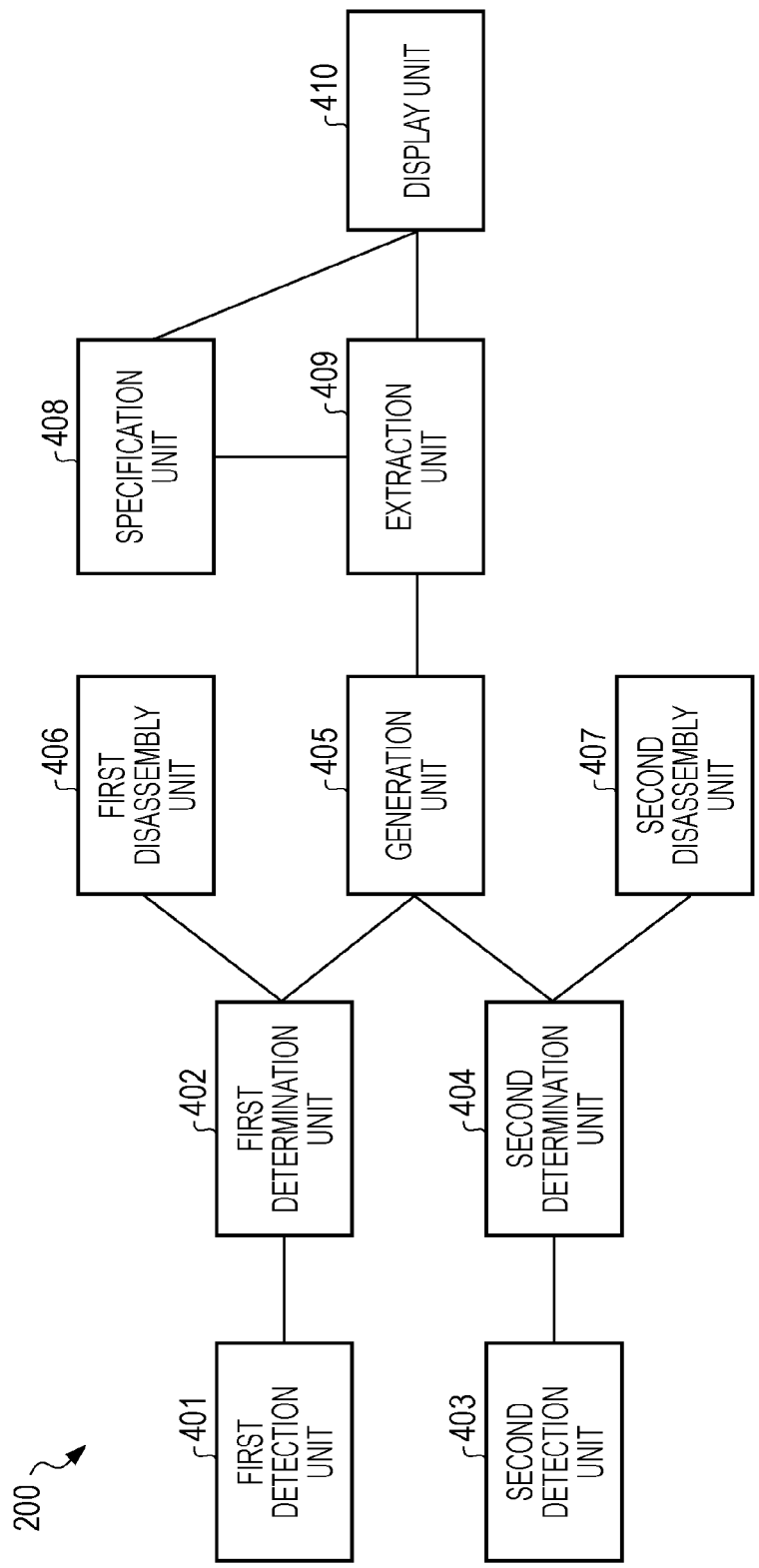
FIG. 4 is a block diagram illustrating an example of a functional configuration of the generation apparatus according to a first embodiment.

FIG. 4 is a block diagram illustrating an example of a functional configuration of the generation apparatus 200 according to the first embodiment. The generation apparatus 200 includes a first detection unit 401, a first determination unit 402, a second detection unit 403, a second determination unit 404, a generation unit 405, a first disassembly unit 406, a second disassembly unit 407, a specification unit 408, an extraction unit 409, and a display unit 410. In particular, the functions of the first detection unit 401, the second detection unit 403, the first determination unit 402, the second determination unit 404, the generation unit 405, the first disassembly unit 406, the second disassembly unit 407, the specification unit 408, the extraction unit 409, and the display unit 410 are realized by, for example, making the processor 201 execute the programs stored in the memory device 202 illustrated in FIG. 2.

The first detection unit 401 detects a contact between the pin data group P1 of the first connection destination that is included in the three-dimensional shape data of the first connection destination and the pin data group P3 of the first connection source that is included in the three-dimensional shape data of the connector. In particular, for example, the generation apparatus 200 inserts the lower end edge portion 104 of the three-dimensional CAD data M1 regarding the first printed circuit board into the opening 103a of the three-dimensional CAD data M3 regarding the connector in accordance with a user operation using an input device such as a mouse so as to connect the three-dimensional CAD data M1 regarding the first printed circuit board and the three-dimensional CAD data M3 regarding the connector. Upon the connection, the first detection unit 401 detects contacts between the pin data items of the pin data group P1 of the three-dimensional CAD data M1 regarding the first printed circuit board and the respective pin data items of the pin data group P3 of the first connection source.

Based on the detection result detected by the first detection unit 401, the first determination unit 402 determines the first contact information 111 that indicates combinations of the pin data items of the pin data group P1 of the first connection destination and the respective pin data items of the pin data group P3 of the first connection source, the pin data items of the pin data group P1 of the first connection destination being in contact with the respective pin data items of the pin data group P3 of the first connection source. In particular, for example, the first determination unit 402 writes identification information of the pin data items that are in contact with each other to the first contact information 111.

FIG. 5 is an explanatory diagram illustrating an example of the first contact information 111. The first contact information 111 includes a contact ID field, a first pin field, and a first connection destination pin field and has the values of each field on a record basis. The contact ID field stores contact IDs. The contact ID is identification information that determines a combination of pins that are in contact with each other. The first pin field stores identification information of pin data items of the first connection source that are to be first pins.

The first connection destination pin field stores identification information of pin data of the first connection destination. The first connection destination pin is a pin that is present on the first printed circuit board and is to come into contact with the corresponding first pin by connecting with the three-dimensional CAD data M3 regarding the connector. For example, ta1 in the contact ID field indicates that the first pin A01 of the three-dimensional CAD data M3 regarding the connector and the first connection destination pin PC1 of the three-dimensional CAD data M1 regarding the first printed circuit board are to be in contact with each other. We now return to FIG. 4.

The second detection unit 403 detects a contact between the pin data group P2 of the second connection destination that is included in the three-dimensional shape data of the second connection destination and the pin data group P4 of the second connection source that is included in the three-dimensional shape data of the connector. In particular, for example, the generation apparatus 200 inserts the pin data items of the pin data group P4 of the second connection source of the three-dimensional CAD data M3 regarding the connector into respective pin data items of the pin data group P2 of the three-dimensional CAD data M2 regarding the second printed circuit board in accordance with a user operation using an input device such as a mouse so as to connect the three-dimensional CAD data M2 regarding the second printed circuit board and the three-dimensional CAD data M3 regarding the connector. Upon the connection, the second detection unit 403 detects contacts between the pin data items of the pin data group P2 of the three-dimensional CAD data M2 regarding the second printed circuit board and the respective pin data items of the pin data group P4 of the second connection source.

Based on the detection result detected by the second detection unit 403, the second determination unit 404 determines the second contact information 112 that indicates combinations of the pin data items of the pin data group P2 of the second connection destination and the respective pin data items of the pin data group P4 of the second connection source, the pin data items of the pin data group P2 of the second connection destination being in contact with the respective pin data items of the pin data group P4 of the second connection source. In particular, for example, the first determination unit 402 writes identification information of the pin data items that are in contact with each other to the second contact information 112.

FIG. 6 is an explanatory diagram illustrating an example of the second contact information 112. The second contact information 112 includes a contact ID field, a second pin field, and a second connection destination pin field and has the values of each field on a record basis. The contact ID field stores contact IDs. Each of the contact IDs is identification information that determines a combination of pins that are in contact with each other. The second pin field stores identification information of pin data items of the second connection source that are to be second pins.

The second connection destination pin field stores identification information of pin data of the second connection destination. The second connection destination pin is a pin that is present on the second printed circuit board and is to come into contact with the corresponding second pin by connecting with the three-dimensional CAD data M3 regarding the connector. For example, tb1 in the contact ID field indicates that the second pin B01 of the three-dimensional CAD data M3 regarding the connector and the second connection destination pin CN1-01 of the three-dimensional CAD data M2 regarding the second printed circuit board are to be in contact with each other. We now return to FIG. 4.

The generation unit 405 generates a connection relationship data group that indicates connection relationships each of which is from one of the pin data items of the pin data group P1 of the first connection destination to the corresponding one of the pin data items of the pin data group P2 of the second connection destination via the corresponding one of the pin data items of the pin data group P3 of the first connection source and the corresponding one of the pin data items of the pin data group P4 of the second connection source. In particular, the generation unit 405 generates the connection relationship data group based on the first contact information 111 and the second contact information 112 determined by the first determination unit 402 and the second determination unit 404, respectively, and based on connection relationships between the pin data items of the pin data group P3 of the first connection source and the respective pin data items of the pin data group P4 of the second connection source. An example of the connection relationships between the pin data items of the pin data group P3 of the first connection source and the respective pin data items of the pin data group P4 of the second connection source is the connection definition information 110 illustrated in FIG. 3.

FIG. 7 is an explanatory diagram illustrating an example of the connection condition data 113 that includes the connection relationship data group. The connection condition data 113 includes a first connection destination field and a second connection destination field. The first connection destination field stores identification information of one printed circuit board to be connected to the three-dimensional CAD data M3 regarding the connector. In FIG. 7, "M1", which is identification information of the first printed circuit board, is stored as an example. The second connection destination field stores identification information of the other printed circuit board to be connected to the three-dimensional CAD data M3 regarding the connector. In FIG. 7, "M2", which is identification information of the second printed circuit board, is stored as an example.

In addition, the connection condition data 113 includes a connection ID field, a first connection destination pin field, a second connection destination pin field, and a delay value field and has the values of each field on a record basis. Each of the records is to be connection relationship data. The connection ID field stores connection IDs. Each of the connection IDs is identification information that uniquely determines connection relationship data. The first connection destination pin field stores identification information of the first connection destination pins included in a printed circuit board that is determined by the first connection destination field. The second connection destination pin field stores identification information of the second connection destination pins included in a printed circuit board that is determined by the second connection destination field. The delay value field stores delay values each of which corresponds to one of the first pins and the corresponding one of the second pins the presence of which allows one of the first connection destination pins and the corresponding one of the second connection destination pin to be in contact with each other.

Here, taking R1 in the connection ID field as an example, a generation example of the connection relationship data will be described. According to the first contact information 111 of FIG. 5, the first pin that is to come into contact with the first connection destination pin PC1 is "A01". According to the connection definition information 110 of FIG. 3, the second pin that is to be connected to the first pin A01 is "B01". According to the second contact information 112 of FIG. 6, the second connection destination pin that is to come into contact with the second pin B01 is "CN1-01". We now return to FIG. 4.

The first disassembly unit 406 disassembles the three-dimensional shape data of the first connection destination and the three-dimensional shape data of the connector that are coupled to each other, and the first disassembly unit 406 renders information that indicates a correspondence relationship of line segments between the pin data items that are in contact relationship with each other based on the first contact information 111. In particular, for example, the first disassembly unit 406 releases the coupling of the three-dimensional CAD data M1 regarding the first printed circuit board and the three-dimensional CAD data M3 regarding the connector. In particular, for example, the first disassembly unit 406 moves the three-dimensional CAD data M1 regarding the first printed circuit board in a direction opposite to the coupling direction. Then, the first disassembly unit 406 renders line segments each of which connects one of the first pins and the corresponding one of the first connection destination pins that are in contact with each other with reference to the first contact information 111. This enables a user to visually recognize which pin of the first printed circuit board is to come into contact with which pin of the connector.

The second disassembly unit 407 disassembles the three-dimensional shape data of the second connection destination and the three-dimensional shape data of the connector that are coupled to each other, and the second disassembly unit 407 renders information that indicates a correspondence relationship of line segments between the pin data items that are in contact relationship with each other based on the second contact information 112. In particular, for example, the second disassembly unit 407 releases the coupling of the three-dimensional CAD data M2 regarding the second printed circuit board and the three-dimensional CAD data M3 regarding the connector. In particular, for example, the second disassembly unit 407 moves the three-dimensional CAD data M2 regarding the second printed circuit board in the direction opposite to the coupling direction. Then, the second disassembly unit 407 renders line segments each of which connects one of the second pins and the corresponding one of the second connection destination pins that are in contact with each other with reference to the second contact information 112. This enables the user to visually recognize which pin of the second printed circuit board is to come into contact with which pin of the connector.

The specification unit 408 receives a specification of one of the pin data items of one of the three-dimensional shape data items of a three-dimensional shape data group that has been disassembled by the first disassembly unit 406 and the second disassembly unit 407. The disassembled three-dimensional shape data group includes the three-dimensional CAD data M1 regarding the first printed circuit board, the three-dimensional CAD data M2 regarding the second printed circuit board, and the three-dimensional CAD data M3 regarding the connector. In particular, for example, the specification unit 408 positions a cursor on one of the pin data items of one of the three-dimensional shape data items of the disassembled three-dimensional shape data group in accordance with a user operation using an input device such as a mouse so as to specify one of the pin data items. In other words, the specification unit 408 may specify any one of the first connection destination pins, any one of the second connection destination pins, the first pins, and the second pins.

The extraction unit 409 extracts a specific connection relationship data item that includes the pin data item specified by the specification unit 408 from the connection relationship data group generated by the generation unit 405. In particular, for example, in the case where the pin data item specified by the specification unit 408 is the first connection destination pin PC1, the extraction unit 409 extracts the connection relationship data of R1 in the connection ID field as the specific connection relationship data item. The extraction unit 409 may extract the first pin and the second pin that are relevant to the specific connection relationship data item. For example, when the connection relationship data of R1 in the connection ID field is extracted, the extraction unit 409 extracts the first pin A01, which is to come into contact with the first connection destination pin PC1, from the first contact information 111. Similarly, when the connection relationship data of R1 in the connection ID field is extracted, the extraction unit 409 extracts the second pin B01, which is to come into contact with the second connection destination pin CN1-01, from the second contact information 112.

When the specification unit 408 specifies the first pin or the second pin, the extraction unit 409 extracts a record that includes the specified pin data item from the connection definition information 110. For example, in the case where the first pin A01 is specified, the extraction unit 409 extracts the second pin B01 from the connection definition information 110. In this case, the extraction unit 409 may extract a pin data item that is to come into contact with the specified pin data item and a pin data item that is to come into contact with the pin data item extracted from the connection definition information 110 with reference to the first contact information 111 and the second contact information 112. For example, in the case where the first pin A01 is specified, the extraction unit 409 extracts the first connection destination pin PC1, which is to come into contact with the first pin A01, from the first contact information 111. The extraction unit 409 also extracts the second connection destination pin CN1-01, which is to come into contact with the second pin B01, from the second contact information 112.

The display unit 410 highlights a pin data group that is included in the specific connection relationship data item extracted by the extraction unit 409. In particular, for example, in the case where the specified pin data item is the first connection destination pin PC1, the display unit 410 specifies the first connection destination pin PC1, which is included in the connection relationship data of R1 in the connection ID field, with reference to the connection condition data 113. Then, the display unit 410 determines the shape data of the first connection destination pin PC1, which is specified, from the three-dimensional CAD data M1 regarding the first printed circuit board and highlights the shape data.

Similarly, the display unit 410 highlights the second connection destination pin CN1-01, which is included in the connection relationship data of R1 in the connection ID field, in the three-dimensional CAD data M2 regarding the second printed circuit board. The display unit 410 highlights any one of the first pins and any one of the second pins in the three-dimensional CAD data M3 regarding the connector in the case where the first pin and the second pin are extracted by the extraction unit 409. The display unit 410 may display identification information of the pins to be highlighted.

Here, the highlighting is a displaying method capable of differentiating a pin from other pins and includes, for example, a process of displaying the pin in a color different from those of the other pins and a process of temporarily deleting the other pins. The display unit 410 may highlight a line segment between the pins included in the specific connection relationship data item in a line segment group that is generated by the first disassembly unit 406 and the second disassembly unit 407.

Figure 8:
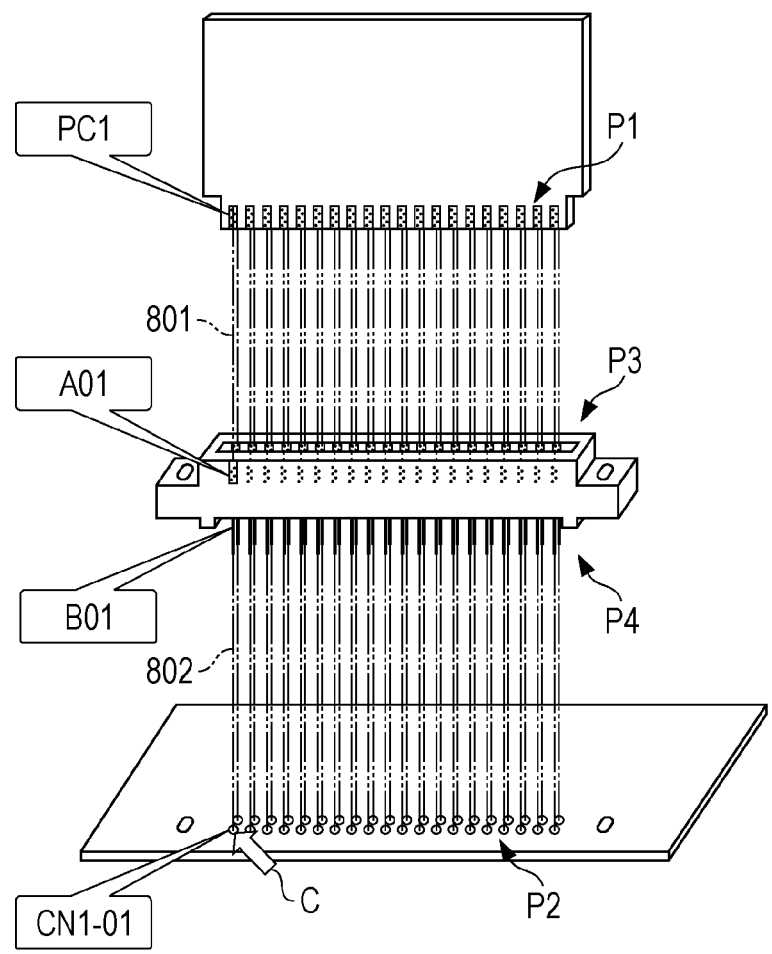
FIG. 8 is an explanatory diagram illustrating a display example of display performed by a display unit.

FIG. 8 is an explanatory diagram illustrating a display example 1 of display performed by the display unit 410. The display example 1 of FIG. 8 is a display example in the case where the second connection destination pin CN1-01 is specified by a mouse cursor C by the specification unit 408 as an example. Line segments (two-dot chain lines) each of which connects pin data items that are in contact with each other are rendered between the three-dimensional CAD data M1 regarding the first printed circuit board and the three-dimensional CAD data M3 regarding the connector. In FIG. 8, the first connection destination pin PC1, the first pin A01, the second pin B01, and the second connection destination pin CN1-01 are highlighted. In addition, the pin names of the first connection destination pin PC1, the first pin A01, the second pin B01, and the second connection destination pin CN1-01 are displayed. Furthermore, a first line segment 801 that connects the first connection destination pin PC1 and the first pin A01 and a second line segment 802 that connects second pin B01 and the second connection destination pin CN1-01 are highlighted.

Figure 9:
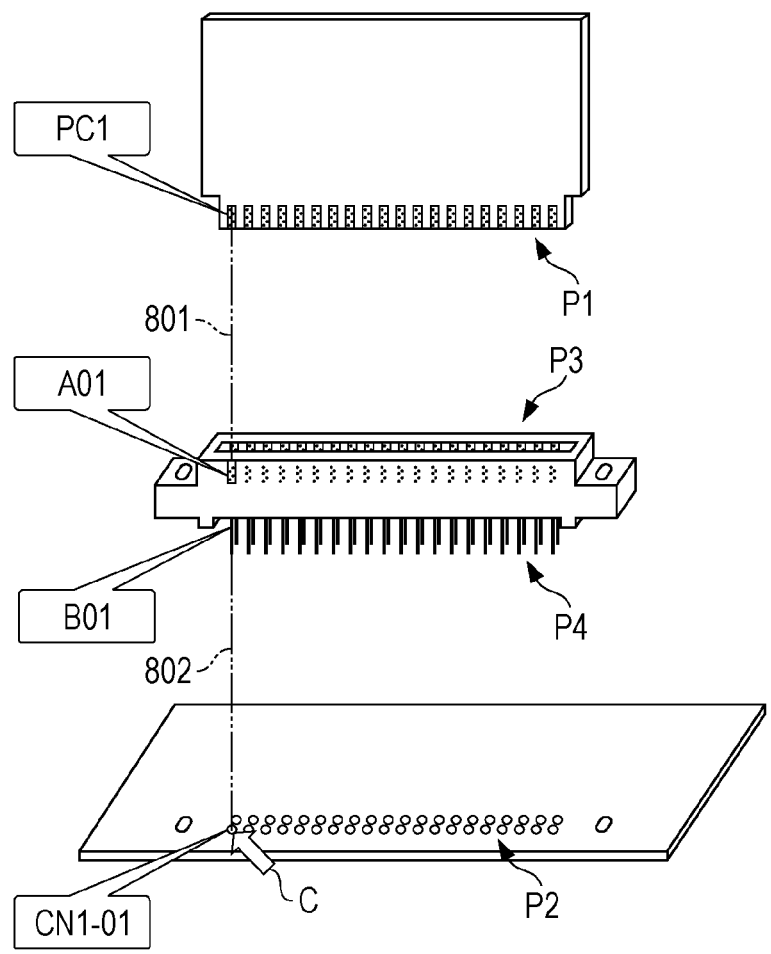
FIG. 9 is an explanatory diagram illustrating another display example of display performed by the display unit.

FIG. 9 is an explanatory diagram illustrating a display example 2 of display performed by the display unit 410. A difference between the display example 1 of FIG. 8 and the display example 2 of FIG. 9 is that line segments other than the first line segment 801 and the second line segment 802 are temporarily deleted in the display example 2 of FIG. 9. Therefore, when the specification is canceled, the deleted line segments will be restored as illustrated in FIG. 8.

Generation Procedure

Figure 10:
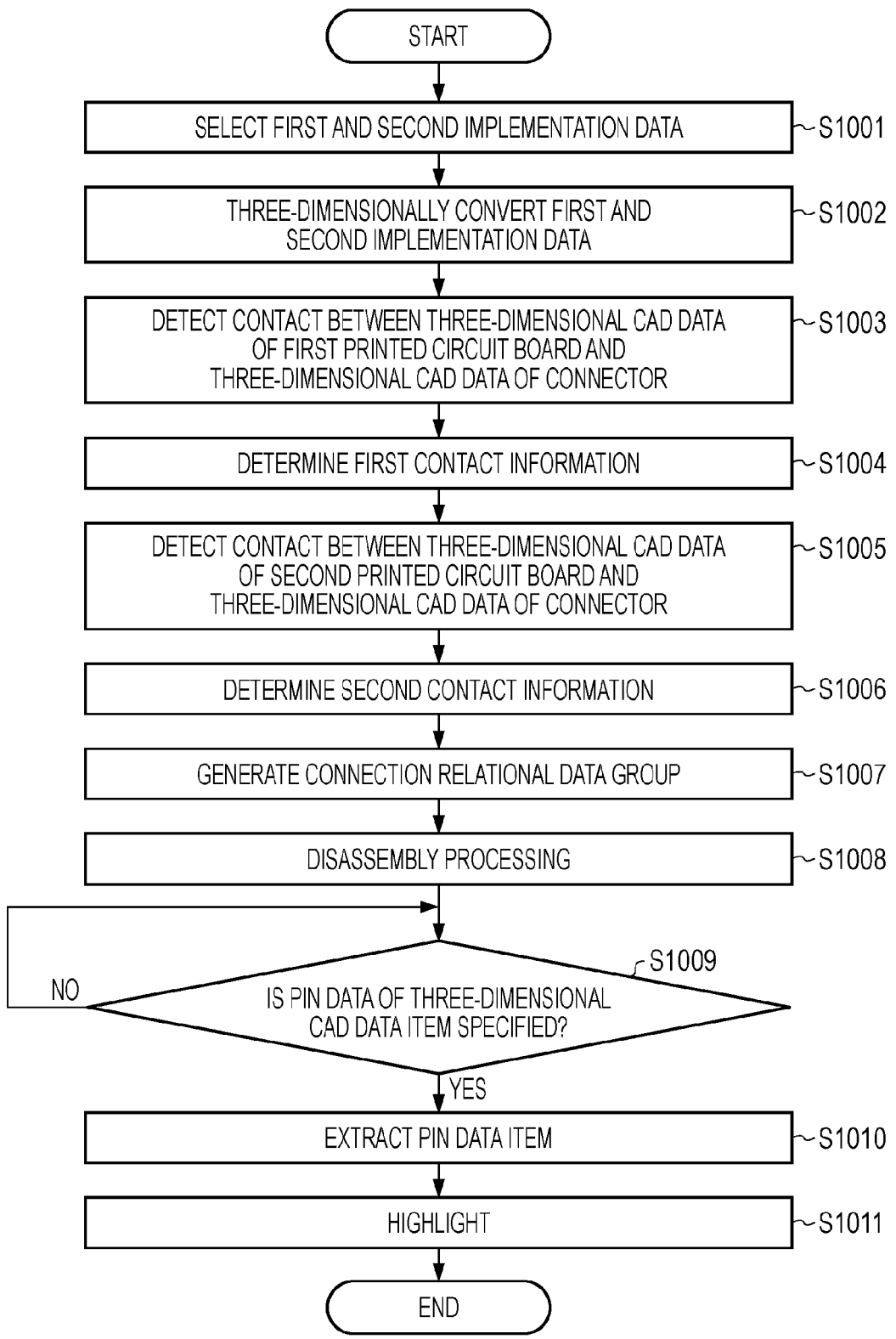
FIG. 10 is a method illustrating an example of a procedure of a generation process performed by the generation apparatus according to the first embodiment.

FIG. 10 is a method illustrating an example of a generation procedure performed by the generation apparatus 200 according to the first embodiment. In FIG. 10, the generation apparatus 200 selects the first implementation data and the second implementation data (step S1001) and three-dimensionally converts the selected first and second implementation data (step S1002). This enables the three-dimensional CAD data M1 regarding the first printed circuit board and the three-dimensional CAD data M2 regarding the second printed circuit board to be rendered in a three-dimensional CAD space.

Next, the generation apparatus 200 detects a contact between the three-dimensional CAD data M1 regarding the first printed circuit board and the three-dimensional CAD data M3 regarding the connector by the first detection unit 401 (step S1003) and determines the first contact information 111 by the first determination unit 402 (step S1004). In addition, the generation apparatus 200 detects a contact between the three-dimensional CAD data M2 regarding the second printed circuit board and the three-dimensional CAD data M3 regarding the connector by the second detection unit 403 (step S1005) and determines the second contact information 112 by the second determination unit 404 (step S1006).

Then, the generation apparatus 200 generates the connection condition data 113 by the generation unit 405 (step S1007) and executes a disassembly process by the first disassembly unit 406 and the second disassembly unit 407 (step S1008). After that, the generation apparatus 200 waits until one of the pin data items of three-dimensional CAD data is specified by the specification unit 408 (NO in step S1009). When the pin data item is specified (YES in step S1009), the generation apparatus 200 extracts, using the extraction unit 409, the pin data item associated with the specified pin data item (step S1010). Then, the generation apparatus 200 highlights, using the display unit 410, the extracted pin data item (step S1011).

According to the first embodiment, the three-dimensional CAD data M1 regarding the first printed circuit board and the three-dimensional CAD data M2 regarding the second printed circuit board is connected via the three-dimensional CAD data M3 regarding the connector, whereby which pin data item of the three-dimensional CAD data M1 regarding the first printed circuit board is to be indirectly connected to which pin data item of the three-dimensional CAD data M2 regarding the second printed circuit board may be checked. Connection relationship data of pin data items may be effectively obtained, and the connection design efficiency may be improved by such operations in the three-dimensional CAD space.

In addition, according to the first embodiment, it is possible to visually recognize which pin data item is to come into contact with which pin data item by connecting the pin data items that are in contact with each other with a line segment and disassembling a three-dimensional CAD data group of three-dimensional CAD data items that are connected to each other.

Furthermore, according to the first embodiment, one of the pin data items in three-dimensional CAD data is specified so that the specified pin data item and the pin data item associated with the specified pin data item will be highlighted, and thus a user may easily check which pin data item is connected to which pin data item.

Second Embodiment

The second embodiment will now be described. In the first embodiment, one of the pin data items of one of the three-dimensional CAD data items of a three-dimensional CAD data group that has been disassembled by the first disassembly unit 406 and the second disassembly unit 407 is specified so that the specified pin data item and the pin data item associated with the specified pin data item are highlighted.

In contrast, the second embodiment is an example in which the connection relationship data group is displayed along with the three-dimensional CAD data group, and in which the pin data item included in one of the connection relationship data items is highlighted instead of specifying one of the pin data items of three-dimensional CAD data. Only the points different from the first embodiment will be described in the second embodiment.

An example of a functional configuration of a generation apparatus 200 according to the second embodiment will be described. The first detection unit 401, the second detection unit 403, the first determination unit 402, the second determination unit 404, the generation unit 405, the first disassembly unit 406, and the second disassembly unit 407 of the generation apparatus 200 according to the second embodiment have the same functions as those of the first embodiment.

In FIG. 4, the specification unit 408 receives a specification of one of the connection relationship data items of the connection relationship data group generated by the generation unit 405. In particular, for example, the specification unit 408 receives a specification of one of the connection relationship data items of the connection relationship data group displayed on a display screen in accordance with an operation of an input device such as a mouse.

The display unit 410 highlights a pin data group that is included in one of the connection relationship data items specified by the specification unit 408 in the three-dimensional shape data group that is disassembled by the first disassembly unit 406 and the second disassembly unit 407. In particular, for example, when the connection relationship data of R1 in the connection ID field is specified, the display unit 410 highlights the first connection destination pin PC1 and the second connection destination pin CN1-01. The display unit 410 may display identification information of the pin data items of the pin data group included in the specified connection relationship data item and may also highlight line segments that correspond to the pin data group included in the specified connection relationship data item.

The display unit 410 may extract the pin data items of the three-dimensional CAD data M3 regarding the connector that are to come into contact with the respective pin data items included in the specified connection relationship data item by the extraction unit 409 and may highlight the extracted pin data items as with the pin data items included in the connection relationship data item. For example, when the connection relationship data of R1 in the connection ID field is specified, the display unit 410 may highlight the first pin A01, which is to come into contact with the first connection destination pin PC1, and the second pin B01, which is to come into contact with the second connection destination pin CN1-01. The display unit 410 may display identification information of the first pin A01 and the second pin B01.

Figure 11:
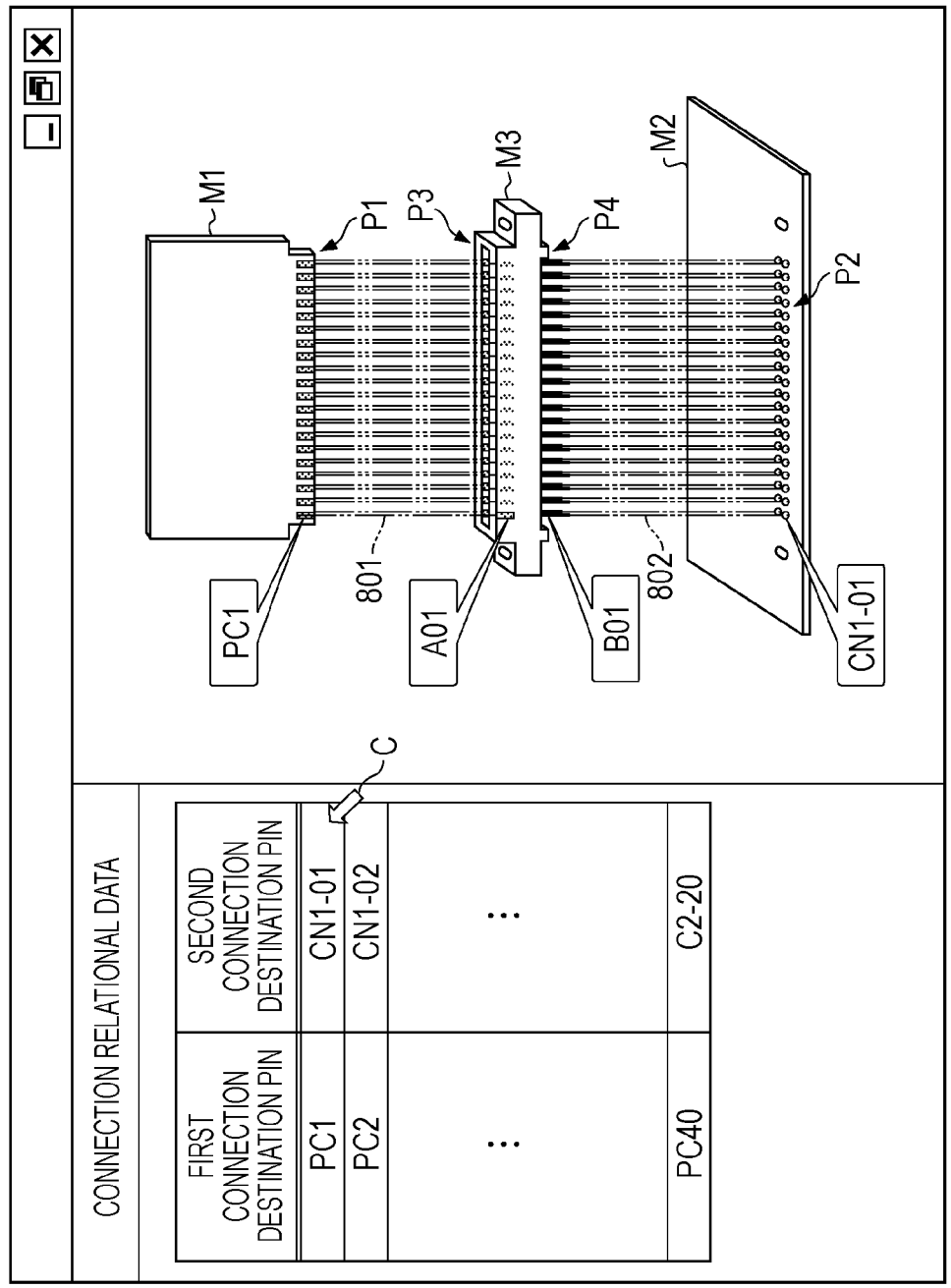
FIG. 11 is an explanatory diagram illustrating still another display example of display performed by the display unit.

FIG. 11 is an explanatory diagram illustrating a display example 3 of display performed by the display unit 410. The display example 3 of FIG. 11 is a display example in the case where the connection relationship data of R1 in the connection ID field, which is a combination of the first connection destination pin PC1 and the second connection destination pin CN1-01, is specified by the mouse cursor C by the specification unit 408 as an example. Line segments (two-dot chain lines) each of which connects pin data items that are in contact with each other are rendered between the three-dimensional CAD data M1 regarding the first printed circuit board and the three-dimensional CAD data M3 regarding the connector.

In FIG. 11, the first connection destination pin PC1, the first pin A01, the second pin B01, and the second connection destination pin CN1-01 are highlighted. In addition, the pin names of the first connection destination pin PC1, the first pin A01, the second pin B01, and the second connection destination pin CN1-01 are displayed. Furthermore, the first line segment 801 that connects the first connection destination pin PC1 and the first pin A01 and the second line segment 802 that connects the second pin B01 and the second connection destination pin CN1-01 are highlighted.

Figure 12:
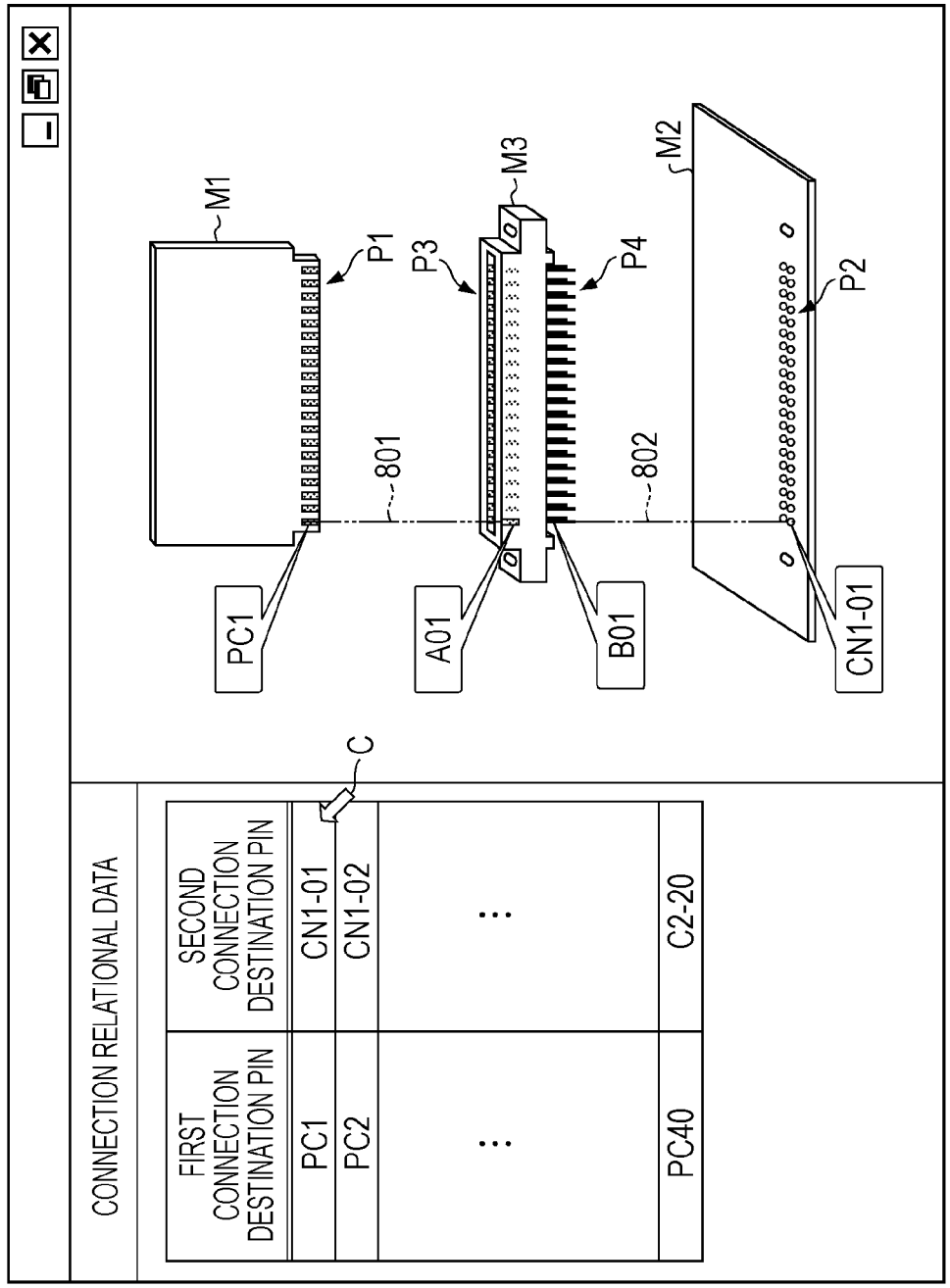
FIG. 12 is an explanatory diagram illustrating yet another display example of display performed by the display unit.

FIG. 12 is an explanatory diagram illustrating a display example 4 of display performed by the display unit 410. A difference between the display example 3 of FIG. 11 and the display example 4 of FIG. 12 is that line segments other than the first line segment 801 and the second line segment 802 are temporarily deleted in the display example 4 of FIG. 12. Therefore, when the specification is canceled, the deleted line segments will be restored as illustrated in FIG. 11.

Generation Procedure

FIG. 13 is a method illustrating an example of a generation procedure performed by the generation apparatus 200 according to the second embodiment. In FIG. 13, the same steps as those illustrated in FIG. 10 are denoted by the same reference numerals, and the descriptions thereof will be avoided.

After step S1008, the generation apparatus 200 waits until one of the connection relationship data items is specified by the specification unit 408 (NO in step S1309). When the connection relationship data item is specified (YES in step S1309), he generation apparatus 200 determines, using the display unit 410, a pin data item in the specified connection relationship data item in three-dimensional CAD data (step S1310). As described above, the display unit 410 may determine a pin data item of the connector that is to come into contact with the pin data item in the specified connection relationship data item. The generation apparatus 200 highlights the pin data item specified by the display unit 410 (step S1311).

According to the second embodiment, it is possible to check which pin data item of the three-dimensional CAD data M1 regarding the first printed circuit board is to be indirectly connected to which pin data item of the three-dimensional CAD data M2 regarding the second printed circuit board by connecting the three-dimensional CAD data M1 regarding the first printed circuit board and the three-dimensional CAD data M2 regarding the second printed circuit board via the three-dimensional CAD data M3 regarding the connector. It may be able to effectively obtain connection relationship data of pin data items and improve the connection design efficiency by such operations in the three-dimensional CAD space.

In addition, according to the second embodiment, it is possible to visually recognize which pin data item is to come into contact with which pin data item by connecting pin data items that are in contact with each other with a line segment and disassembling a three-dimensional CAD data group of three-dimensional CAD data items that are connected to each other.

Furthermore, according to the second embodiment, a user operates an input device to cause the generation apparatus 200 to specify connection relationship data that is what the user desires to check so as to be able to visually recognize which pin data items of three-dimensional CAD data correspond to the specified connection relationship data item. Therefore, for example, when the user desires to verify a pin data item, the user may check the positions and connection relationship of the pin data items in a three-dimensional CAD space by specifying a connection relationship data item that includes the pin name of the pin data item.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program for causing a computer to execute a generation process, the process comprising:
   detecting a contact between a pin data group of a first connection destination included in three-dimensional shape data of the first connection destination and a pin data group of a first connection source included in three-dimensional shape data of a connector;
   determining, based on a first detection result that is detected, first contact information that indicates combinations of pin data items of the pin data group of the first connection destination and respective pin data items of the pin data group of the first connection source, the pin data items of the pin data group of the first connection destination being in contact with the respective pin data items of the pin data group of the first connection source;
   detecting a contact between a pin data group of a second connection destination included in three-dimensional shape data of the second connection destination and a pin data group of a second connection source included in the three-dimensional shape data of the connector;
   determining, based on a second detection result that is detected, second contact information that indicates combinations of pin data items of the pin data group of the second connection destination and respective pin data items of the pin data group of the second connection source, the pin data items of the pin data group of the second connection destination being in contact with the respective pin data items of the pin data group of the second connection source; and
   generating, based on the first contact information and the second contact information, which are determined, and based on connection relationships of the pin data items of the pin data group of the first connection source and the respective pin data items of the pin data group of the second connection source, a connection relationship data group that indicates connection relationships of connections, each of the connections being established from one of the pin data items of the pin data group of the first connection destination to the corresponding one of the pin data items of the pin data group of the second connection destination via the corresponding one of the pin data items of the pin data group of the first connection source and the corresponding one of the pin data items of the pin data group of the second connection source.

2. The non-transitory computer-readable recording medium according to claim 1, the process further comprising:
   disassembling the three-dimensional shape data of the first connection destination and the three-dimensional shape data of the connector that are coupled to each other;
   rendering information that indicates a correspondence relationship between the pin data items that are in contact relationship with each other based on the first contact information;
   disassembling the three-dimensional shape data of the second connection destination and the three-dimensional shape data of the connector that are coupled to each other; and
   rendering information that indicates a correspondence relationship between the pin data items that are in contact relationship with each other based on the second contact information.

3. The non-transitory computer-readable recording medium according to claim 2, the process further comprising:
   receiving a specification of one of pin data items in one of three-dimensional shape data items of a three-dimensional shape data group that has been disassembled;
   extracting a specific connection relationship data item including the pin data item that has been specified from the connection relationship data group that has been generated; and
   highlighting pin data groups included in the specific connection relationship data item that has been extracted.

4. The non-transitory computer-readable recording medium according to claim 3,
   wherein, in the highlighting, identification information of pin data items of the pin data groups included in the specific connection relationship data item is displayed.

5. The non-transitory computer-readable recording medium according to claim 3,
   wherein, in the highlighting, a line segment corresponding to the pin data groups included in the specific connection relationship data item is highlighted.

6. The non-transitory computer-readable recording medium according to claim 2, the process further comprising:
- receiving a specification of one of connection relationship data items included in the connection relationship data group that has been generated; and
- highlighting pin data groups included in the one of the connection relationship data items that has been specified in the three-dimensional shape data group that has been disassembled.

7. The non-transitory computer-readable recording medium according to claim 6,
wherein, in the highlighting, identification information of pin data items of the pin data groups included in the one of the connection relationship data items is displayed.

8. The non-transitory computer-readable recording medium according to claim 6,
wherein, in the highlighting, a line segment corresponding to the pin data groups included in the one of the connection relationship data items is highlighted.

9. A generation method executed by a computer, comprising:
- first detecting a contact between a pin data group of a first connection destination included in three-dimensional shape data of the first connection destination and a pin data group of a first connection source included in three-dimensional shape data of a connector;
- first determining, based on a first detection result that is detected, first contact information that indicates combinations of pin data items of the pin data group of the first connection destination and respective pin data items of the pin data group of the first connection source, the pin data items of the pin data group of the first connection destination being in contact with the respective pin data items of the pin data group of the first connection source;
- second detecting a contact between a pin data group of a second connection destination included in three-dimensional shape data of the second connection destination and a pin data group of a second connection source included in the three-dimensional shape data of the connector;
- second determining, based on a second detection result that is detected, second contact information that indicates combinations of pin data items of the pin data group of the second connection destination and respective pin data items of the pin data group of the second connection source, the pin data items of the pin data group of the second connection destination being in contact with the respective pin data items of the pin data group of the second connection source; and
- generating, based on the first contact information and the second contact information, which are determined, and based on connection relationships of the pin data items of the pin data group of the first connection source and the respective pin data items of the pin data group of the second connection source, a connection relationship data group that indicates connection relationships of connections, each of the connections being established from one of the pin data items of the pin data group of the first connection destination to the corresponding one of the pin data items of the pin data group of the second connection destination via the corresponding one of the pin data items of the pin data group of the first connection source and the corresponding one of the pin data items of the pin data group of the second connection source, wherein the first detecting, the first determining, the second detecting, the second determining, and the generating are performed by one or more processors of the computer.

10. A generation apparatus comprising:
one or more processors configured to:
first detect a contact between a pin data group of a first connection destination included in three-dimensional shape data of the first connection destination and a pin data group of a first connection source included in three-dimensional shape data of a connector;
first determine, based on a detection result that is detected by the first detecting, first contact information that indicates combinations of pin data items of the pin data group of the first connection destination and respective pin data items of the pin data group of the first connection source, the pin data items of the pin data group of the first connection destination being in contact with the respective pin data items of the pin data group of the first connection source;
second detect a contact between a pin data group of a second connection destination included in three-dimensional shape data of the second connection destination and a pin data group of a second connection source included in the three-dimensional shape data of the connector;
second determine, based on a detection result that is detected by the second detecting, second contact information that indicates combinations of pin data items of the pin data group of the second connection destination and respective pin data items of the pin data group of the second connection source, the pin data items of the pin data group of the second connection destination being in contact with the respective pin data items of the pin data group of the second connection source; and
generate, based on the first contact information and the second contact information, which are determined by the first determining and the second determining, respectively, and based on connection relationships of the pin data items of the pin data group of the first connection source and the respective pin data items of the pin data group of the second connection source, a connection relationship data group that indicates connection relationships of connections, each of the connections being established from one of the pin data items of the pin data group of the first connection destination to the corresponding one of the pin data items of the pin data group of the second connection destination via the corresponding one of the pin data items of the pin data group of the first connection source and the corresponding one of the pin data items of the pin data group of the second connection source.

* * * * *